(12) United States Patent
Wang et al.

(10) Patent No.: US 12,270,660 B2
(45) Date of Patent: Apr. 8, 2025

(54) EFFICIENT MAP MATCHING METHOD FOR GLOBAL POSITIONING SYSTEM (GPS) TRAJECTORY

(71) Applicant: Chang'an University, Xi'an (CN)

(72) Inventors: Yuanqing Wang, Xi'an (CN); Yaxiang Li, Xi'an (CN); Zhouhao Wu, Xi'an (CN); Minghui Xie, Xi'an (CN); Sen Wei, Xi'an (CN); Shuxin Jin, Xi'an (CN); Yabin Sun, Xi'an (CN)

(73) Assignee: Chang'an University, Xi'an (CN)

( * ) Notice: Subject to any disclaimer, the term of this patent is extended or adjusted under 35 U.S.C. 154(b) by 0 days.

(21) Appl. No.: 18/015,348

(22) PCT Filed: Jun. 15, 2022

(86) PCT No.: PCT/CN2022/098815
§ 371 (c)(1),
(2) Date: Jan. 10, 2023

(87) PCT Pub. No.: WO2022/262741
PCT Pub. Date: Dec. 22, 2022

(65) Prior Publication Data
US 2024/0302172 A1 Sep. 12, 2024

(30) Foreign Application Priority Data
Jun. 18, 2021 (CN) .......................... 202110674847.8

(51) Int. Cl.
*B60L 1/00* (2006.01)
*B60K 35/00* (2024.01)
*B60L 15/00* (2006.01)
*B60L 58/12* (2019.01)
*G01C 21/30* (2006.01)
*G01C 21/34* (2006.01)
*G01S 19/42* (2010.01)

(52) U.S. Cl.
CPC ......... *G01C 21/30* (2013.01); *G01C 21/3446* (2013.01); *G01S 19/42* (2013.01)

(58) Field of Classification Search
CPC ..... G01C 21/30; G01C 21/3446; G01S 19/42; G06F 16/29
See application file for complete search history.

(56) References Cited

U.S. PATENT DOCUMENTS

2008/0262721 A1    10/2008   Guo

FOREIGN PATENT DOCUMENTS

| CN | 112327338 A | * | 2/2021 | ............. G01S 19/39 |
| CN | 113254562 A | * | 6/2021 | ............. G06F 16/29 |

* cited by examiner

*Primary Examiner* — Brian P Sweeney
(74) *Attorney, Agent, or Firm* — IP Attorneys Group, LLC

(57) ABSTRACT

An efficient map matching method for GPS trajectory includes: obtaining a valid GPS point list; obtaining a current searched end point; backtracking a best map matching path from the current searched end point, traversing GPS points along the path to obtain best matching results, and summarizing the best matching results to output a matching result statistical table; and determining whether the current searched end point is a final point.

8 Claims, 4 Drawing Sheets

(a) GPS trajectory in single trip (b) Overall sampling distribution of GPS trajectory

EFFICIENT MAP MATCHING METHOD FOR GLOBAL POSITIONING SYSTEM (GPS) TRAJECTORY

CROSS REFERENCE TO RELATED APPLICATION

The present application claims priority to the Chinese Patent Application No. 202110674847.8, filed with the China National Intellectual Property Administration (CNIPA) on Jun. 18, 2021, and entitled "EFFICIENT MAP MATCHING METHOD FOR GLOBAL POSITIONING SYSTEM (GPS) TRAJECTORY", which is incorporated herein by reference in its entirety.

TECHNICAL FIELD

The present disclosure relates to the technical field of traffic, and in particular to an efficient map matching method for a GPS trajectory.

BACKGROUND

Urban traffic network system is a complicated giant system, in which tens of thousands of traffic flows operate and move on a network structure all the time. How to acquire comprehensive and accurate spatio-temporal traffic data to provide powerful data and theoretical supports have become a main topic in the field of intelligent analysis on the traffic system in recent years.

As a quickly and easily available data source, on-board GPS has advantages of wide coverage, strong temporal continuity, and direct correlation with the traffic network, and has been widely used to analyze various big data traffic systems. By mapping real-time trajectory information of the GPS to the traffic network, statistical results obtained not only can effectively cover a wide range of spatio-temporal traffic information of cities, but also can describe an operation state of regional transportation accurately as required. The basic step in systematic analysis is to accurately map a vehicle travel trajectory on a road network which is referred to as "map matching". Relevant algorithms are generally divided into four categories: geometric, topological, probabilistic, and advanced.

Quick and accurate description on "a matching relation between the vehicle travel trajectory and the road network" is of great importance to vehicle navigation, location based services (LBSs), analysis on the traffic network system, etc. However, among various matching algorithms, there are still some technical defects in logic. Conventional stepwise matching algorithms such as the hidden Markov model (HMM)-based matching algorithm, multi-criteria dynamic programming (MDP) matching algorithm, and locality based matching (LBMM) algorithm have the following defects: 1) The stepwise matching significantly has a slower speed than segment-wise matching, as path analysis is performed point by point in the matching process, which greatly restricts application effects of the map matching algorithm. For example, the map paths get stuck in the vehicle navigation and LBSs, and there haven't been effective application cases of the offline map matching in conventional traffic planning and systematic analysis. 2) The overall matching proportion is low. In various matching algorithms, matched mileages do not account for 90% as a result of a topological error in the road network, a sampling error of GPS points, etc. 3) The matching accuracy and proportion are hardly considered simultaneously. If algorithms such as the path search algorithm are used for accurate matching, the overall matching proportion is low and sometimes is lower than 50% due to the network topology. Estimating the travel trajectory with a travel direction is prone to a local matching error. 4) There are a lack of effective logic control, and an uncontrollable local matching error. Particularly in the case of regions with complicated structures in the traffic network, such as various parallel road segments to main and side roads, and intersections, the matching error is unavoidable. 5) Abnormal GPS points caused by equipment faults and the like are not processed effectively to seriously effect a matching quality.

For the latest matching algorithm based on "path searching and spatial point weighting" (application No. CN 202110005167.7), there are also some inherent defects to seriously affect the matching efficiency, such as information overlap in forward searching, and unavoidable endless loop in backtracking verification due to the algorithm design.

SUMMARY

An objective of the present disclosure is to provide an efficient map matching method for a GPS trajectory, to solve the problem that an existing matching method for a GPS trajectory hardly considers matching accuracy and efficiency, and has the low matching efficiency.

To achieve the above objective, the present disclosure provides the following technical solutions: The present disclosure provides an efficient map matching method for a GPS trajectory, including the following steps:

S1: acquiring a plurality of GPS points through which a GPS of a vehicle passes, and initializing the plurality of GPS points to obtain a valid GPS point list VP={vp(1), vp(2), ... vp(k)};

S2: establishing map matching work from a first point vp(1) in the valid GPS point list VP={vp(1), vp(2), ..., vp(k)} for forward iteration, and obtaining a current searched end point vp(s) with a GPS point guided path search algorithm, where the forward iteration is to perform point-by-point iteration from the first point vp(1) to backwardly search a matching path;

S3: backtracking a best map matching path from the current searched end point vp(s), traversing GPS points along the path to obtain best matching results, and summarizing the best matching results to output a matching result statistical table; and S4: determining, according to the matching result statistical table, whether the current searched end point vp(s) is a final point vp(k); completing efficient map matching for a GPS trajectory if yes; or otherwise, taking a point vp(s+1) as a first point for map matching, and going back to step S2.

The present disclosure has the following beneficial effects:

(1) The present disclosure replaces the conventional "GPS point guided path search logic" with a "path search guided GPS point matching logic", solves the problem of endless loop in backtracking of the emerging algorithm, avoids the complicated and inefficient map data calling process in the conventional matching logic, and greatly improves the map matching efficiency.

(2) The present disclosure can be widely applied to the fields of edge computing, navigation systems and urban traffic data mining and management.

BRIEF DESCRIPTION OF THE DRAWINGS

The present disclosure will be further described below with reference to the accompanying drawings.

DETAILED DESCRIPTION OF THE EMBODIMENTS

The specific implementations of the present disclosure are described below to facilitate those skilled in the art to understand the present disclosure, but it should be clear that the present disclosure is not limited to the scope of the specific implementations. Various obvious changes made by those of ordinary skill in the art within the spirit and scope of the present disclosure defined by the appended claims should fall within the protection scope of the present disclosure.

Embodiment

Descriptions are made to the following parameters before the embodiment is illustrated:

In the embodiment, false represents no, while true represents yes.

Figure 1:
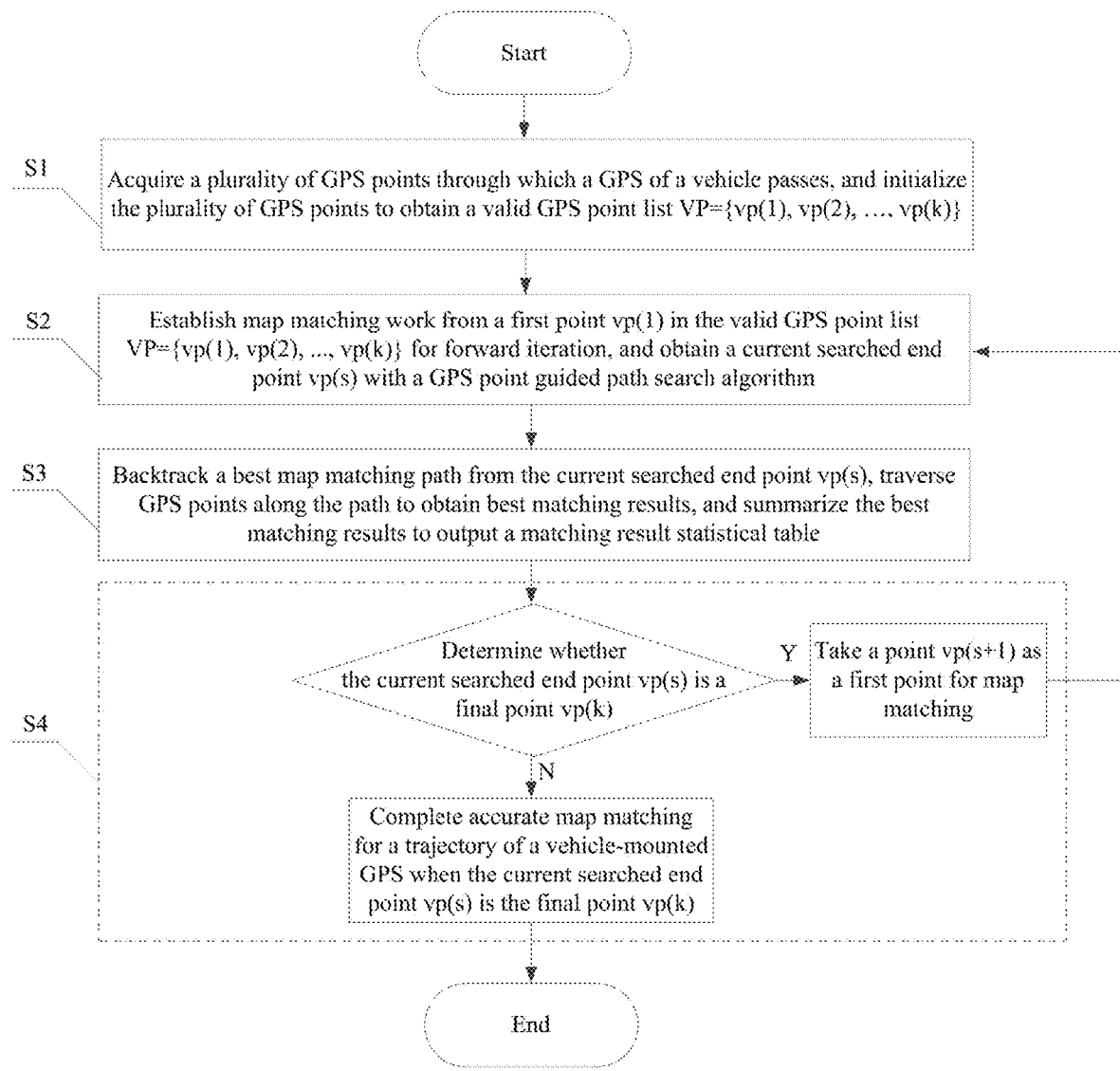
FIG. 1 is a flowchart of a method according to the present disclosure.

As shown in FIG. 1, the present disclosure provides an efficient map matching method for a GPS trajectory, including the following steps:

S1: Acquire a plurality of GPS points through which a GPS of a vehicle passes, and initialize the plurality of GPS points to obtain a valid GPS point list VP={vp(1), vp(2), ..., vp(k)}. Specifically:

S101: Acquire the plurality of GPS points through which the GPS of the vehicle passes.

S102: Separate the plurality of GPS points into a segment set Trip(a)={T1, T2, ..., Ta, ..., Tn}, where Ta represents a segment, the segment Ta includes a plurality of GPS points, and Tn represents a total number of segments.

S103: Select a GPS point p(i) from the plurality of GPS points {p(1), p(2), ..., p(i), ..., p(n)} in the segment Ta as a current GPS point, where p(n) represents a total number of the GPS points.

S104: Determine whether a linear speed from the current GPS point p(i) to a GPS point p(i+1) is greater than 300 km/h. If yes, remove the current GPS point p(i), go to the next GPS point p(i+1), and repeat Step S104. Or otherwise, go to Step S105. Or, Determine whether an interval between the current GPS point p(i) and the GPS point p(i+1) is less than or equal to 0. If yes, remove the current GPS point p(i), go to the next GPS point p(i+1), and repeat Step S104. Or otherwise, go to Step S105.

S105: Assume a last cumulative travel distance variable of the current GPS point as p(i).lastD.

S106: Determine whether the p(i).lastD is less than 20 m. If yes, calculate a distance from a GPS point p(i−1) to the GPS point p(i), remove the GPS point p(i), and go to Step S107. Or otherwise, when the p(i).lastD is greater than 20 m, incorporate the current GPS point p(i)=vp(1) into the valid GPS point list VP={vp(1), vp(2), ..., vp(k)}, and go to Step S107.

In the embodiment, if the distance is less than 20 m and is 3 m for example, and the last cumulative travel distance variable of the current GPS point is assumed as p(i).lastD=10 m, a current cumulative travel distance of the GPS point p(i+1) is p(i).currentD=p(i).lastD+3=13, the GPS point p(i+1).lastD=p(i).currentD, and the GPS point p(i) is removed from the point list.

S107: Determine whether all of the GPS points in the segment Ta is taken as the current GPS point respectively. If yes, establish the valid GPS point list VP={vp(1), vp(2), ..., vp(k)}, acquire a to-be-matched near link set NearL(k) in map data for each of GPS points k in the GPS point list VP={vp(1), vp(2), ..., vp(k)}, initialize a matching result variable Match(k)=−1, and a best matching weight MatchW(k)=10000, thereby completing establishment of the valid GPS point list VP={vp(1), vp(2), ..., vp(k)}, and go to Step S2. Or otherwise, go back to Step S101.

S2: Establish map matching work from a first point vp(1) in the valid GPS point list VP={vp(1), vp(2), ..., vp(k)} for forward iteration, and obtain a current searched end point vp(s) with a GPS point guided path search algorithm. Specifically:

S201: Establish the map matching work from the first point vp(1) in the valid GPS point list VP={vp(1), vp(2), ..., vp(k)} for the forward iteration.

S202: Perform the forward iteration according to the map matching work, and assume that there are a start point Startp and an end point Endp in the valid GPS point list VP={vp(1), vp(2), ..., vp(k)}.

S203: Determine whether a trajectory number for the start point Startp is less than or equal to a trajectory number for the end point Endp. If yes, go to Step S204. Or otherwise, match a GPS trajectory completely to obtain a best map matching path from the first point vp(1) to the final point vp(k), and go to Step S3.

S204: Search a shortest path from the start point Startp to the end point Endp with the GPS point guided path search algorithm, and determine whether an iteration process for path search is terminated. If yes, acquire an alternative path, and go to Step S3. Or otherwise, repeat Step S204 until the iteration for the path search is terminated. Specifically:

S2041: Initialize matching variables of the start point Startp, the matching variables including a last start point Lastp being initialized as the start point Startp, a current furthest matching point Pnow, a modified road network point set NList, a search open point set OpenL, a corresponding search heading reference variable set Open ValueL, a search closed road network point set CloseL and a start point near road network link set NearL (Startp).

S2042: Establish the map matching work on each of links in the start point near road network link set NearL (Startp) for a circulation.

S2043: Determine whether the link satisfies a departure condition. If yes, incorporate a corresponding end point of the link into the search open point set OpenL, respectively update the corresponding search heading reference variable set Open ValueL, the modified road network point set NList as well as a search attribute set Search(s) of a forward search end point s corresponding to the link, and go to Step S2044 when the circulation is terminated, and the search open point set OpenL is not null. Or otherwise, select a near link with a maximum matching value as a matching result of the start point Startp, update the start point Startp as a start point Startp+1, and go back to Step S202, the search attribute set Search(s) of the end point including a departure cut cost StartCut(s), a physical path cost SPcost(s), a local cut cost LOCcost(s), a GPS point weighting cost PWcost(s), a corresponding trajectory number ValidN(s), a local added trajectory Padd(s), and a via link SPvia(s).

S2044: Establish an iteration on the forward search end point s in the search open point set OpenL, and determine whether the search open point set OpenL is null upon completion of the iteration. If yes, acquire an alternative path, and go to Step S3. Or otherwise, go to Step S2045.

S2045: Select a first forward search end point s in the search open point set OpenL for search, respectively acquire a corresponding trajectory number ValidN(s) and a corresponding search heading reference variable Open ValueL value Open ValueL.begin of the forward search end point s, and determine whether the corresponding trajectory number ValidN(s) is greater than a trajectory number for a start point Startp−1. If yes, remove the forward search end point s and a corresponding heading variable HeadDist from the search open point set OpenL and a first corresponding search heading reference variable set Open ValueL corresponding to the forward search end point s, and go to Step S2046. Or otherwise, go to Step S2048.

S2046: If the corresponding trajectory number ValidN(s) is less than the trajectory number for the end point Endp, and the corresponding trajectory number ValidN(s) is less than a trajectory number for the current furthest matching point Pnow, calculate a heading judgment distance Jdist, and go to Step S2047. Or, If the corresponding trajectory number ValidN(s) is less than the trajectory number for the end point Endp, and the local added trajectory Padd(s)=0, calculate the heading judgment distance Jdist, and go to Step S2047.

S2047: Determine whether the corresponding search heading reference variable value Open ValueL(s) of the forward search end point s is greater than 2*the heading judgment distance Jdist, and the heading judgment distance Jdist is greater than 250 m. If yes, go to Step S2045. Or otherwise, go to Step S2048. Or Determine whether the corresponding search heading reference variable Open ValueL(s) of the forward search end point s is greater than 450 m, and the heading judgment distance Jdist is less than or equal to 250 m. If yes, go back to Step S2045. Or otherwise, go to Step S2048.

S2048: Establish a circulation for a forward link set ForwardL of the current forward search end point s, and extract a forward link u and a next road network point n(u). When a via link SPvia(s) is not null, if the via link SPvia(s) of the forward search end point s is the forward link u, go to a next forward link in the forward link set ForwardL, and continuously calculate a moving angle MoveAng(u) between the forward link u and a GPS point vp (ValidN(s)).

S2049: Determine whether the moving angle MoveAng(u) is greater than or equal to 100°. If yes, go to the next forward link u in the forward link set ForwardL, and go back to Step S2048. Or otherwise, insert the forward link u into an extended link set NextL according to the moving angle MoveAng(u) in an ascending manner, and go to Step S20410 upon completion of the circulation.

S20410: Establish a forward search circulation on elements in the extended link set NextL, extract a forward link u and a next road network point n(u), and initialize a local GPS point weighting variable PWac=0, a matched GPS point number Sernow=corresponding trajectory number ValidN(s), a local added number AddN=0 and a turnaround indicating variable TurnIndi=false.

S20411: When the matched GPS point number Sernow is less than the trajectory number for the end point Endp, initialize an iteration indicating variable Indi=true, establish a forward trajectory matching gain, and determine whether the iteration indicating variable Indi=false upon completion of the iteration. If yes, go to Step S20412. Or otherwise, go to Step S20415.

S20412: Assume the matched GPS point number Sernow as a matched GPS point number Sernow+1, search a forward link u in a near link set NearL (Sernow) of a GPS point vp (Sernow), and determine whether the forward link u is not included in the near link set NearL (Sernow) of the GPS point vp (Sernow). If yes, go to Step S20413. Or otherwise, go to Step S20414. Or, Assume the matched GPS point number Sernow as the matched GPS point number Sernow+1, search the forward link u in the near link set NearL (Sernow) of the GPS point vp (Sernow), and determine whether the iteration indicating variable Indi=false upon completion of the iteration when the matched GPS point number is the trajectory number for the end point Endp. If yes, go to Step S20413. Or otherwise, go to Step S20414.

S20413: Determine whether the local added number AddN=0. If yes, go to Step S20415. Or otherwise, go to Step S20416 when the local added number AddN is greater than 0.

S20414: Assume the local added number AddN as a local added number AddN+1, the local GPS point weighting variable PWac as PWac+(Sernow).Weight(u), the turnaround indicating variable TurnIndi=true if the GPS point has a turnaround, and the iteration indicating variable Indi=false. Go to Step S20415 when the local added number AddN=0, and determine whether the local added number AddN is greater than 0. If yes, go to Step S20421. Or otherwise, go back to Step S20412. vp(Sernow).Weight(u) represents the GPS point vp.

S20415: When the trajectory number for the forward search end point s is greater than the trajectory number for the start point Startp, determine whether a corresponding trajectory number ValidN(n(u)) for a forward search end point n(u) of the forward link u is null. If yes, go to Step S20416. Or otherwise, go to Step S20417.

S20416: Calculate a local search cost Costnow, assume a local cut cost LOCcost(n(u))=Costnow for the forward end point n(u) of the forward link u, a via link SPvia (n(u))=u for the forward end point n(u) of the forward link u, a local added trajectory Padd(n(u))=0 for the forward end point n(u) of the forward link u, a physical path cost SPcost(n(u))=SPcost(s)+Length(u) for the forward end point n(u) of the forward link u, and a GPS point weighting cost PWcost(n(u))=PWac for the forward end point n(u) of the forward link u, insert the forward end point n(u) into an end of the modified road network point set NList, and go to Step S20419. The local search cost Costnow is expressed by:

$$Costnow = LOCcost(s) + Length(u)$$

In the foregoing formula, LOCcost(s) represents the local cut cost for the forward search end point s, and Length(u) represents a length of the forward link u.

S20417: Determine whether the corresponding trajectory number ValidN(n(u)) for the forward end point n(u) of the forward link u is the corresponding trajectory number ValidN(s) for the forward search end point s. If yes, go to Step S20418. Or otherwise, go to Step S20419 when the corresponding trajectory number ValidN(n(u)) for the forward end point n(u) of the forward link u is less than the corresponding trajectory number ValidN(s) for the forward search end point s.

S20418: Calculate a path matching cost Cost1 according to the corresponding trajectory number ValidN(n(u)) for the forward end point n(u) of the forward link u, calculate, according to the corresponding trajectory number ValidN(n(u)) for the forward end point n(u) of the forward link u if the path matching cost Cost1 is less than a path matching cost Cost2, a local cut cost LOCcost(n(u)) for the forward end point n(u) of the forward link u, assume a via link SPvia(n(u))=u for the forward end point n(u) of the forward link u and a local added trajectory Padd(n(u))=0 for the forward end point n(u) of the forward link u, calculate a physical path cost SPcost(n(u)) for the forward end point n(u) of the forward link u and assume that a GPS point weighting cost PWcost(n(u)) for the forward end point n(u) of the forward link u is the same as the GPS point weighting cost PWcost(s) for the forward search end point s, and go to Step S20420. The path matching cost is expressed by:

$$Cost1 = SPcost(s) + Length(u) + PWcost(s)$$

In the foregoing formula, SPcost(s) represents the physical path cost for the forward search end point s, Length(u) represents the length of the forward link u, and PWcost(s) represents the GPS point weighting cost for the forward search end point s.

The path matching cost Cost2 is expressed by:

$$Cost2 = SPcost(n(u)) + PWcost(n(u))$$

In the foregoing formula, SPcost(n(u)) represents the physical path cost for the forward end point n(u) of the forward link u, and PWcost(n(u)) represents the GPS point weighting cost for the forward end point n(u) of the forward link u.

The local cut cost LOCcost(n(u)) for the forward end point n(u) of the forward link u is expressed by:

$$LOCcost(n(u)) = LOCcost(s) + Length(u)$$

In the foregoing formula, LOCcost(s) represents the local cut cost for the forward search end point s, and Length(u) represents the length of the forward link u.

$$SPcost(n(u)) = SPcost(s) + Length(u)$$

In the foregoing formula, SPcost(s) represents the physical path cost for the forward search end point s, and Length(u) represents the length of the forward link u.

S20419: Calculate a heading variable HeadDist according to the local cut cost LOCcost(n(u)) for the forward search end point s and the length Length(u) of the forward link u, assume a local cut cost LOCcost(n(u))=HeadDist for the forward end point n(u) of the forward link u, a via link SPvia(n(u))=u for the forward end point n(u) of the forward link u, a local added trajectory Padd(n(u))=0 for the forward end point n(u) of the forward link u, a corresponding trajectory number ValidN(n(u))=ValidN(s) for the forward end point n(u) of the forward link u, a physical path cost SPcost(n(u))=SPcost(s)+Length(u) for the forward end point n(u) of the forward link u, and a GPS point weighting cost PWcost(n(u))=PWcost(s) for the forward end point n(u) of the forward link u, and go to Step S20425. The heading variable HeadDist is expressed by:

$$HeadDist = LOCcost(s) + Length(u)$$

In the foregoing formula, LOCcost(s) represents the local cut cost for the forward search end point s, and Length(u) represents the length of the forward link u.

S20420: Calculate a current matching GPS point progress Mnow according to the corresponding trajectory number ValidN(s) for the forward search end point s, and determine whether the corresponding trajectory number ValidN(n(u)) for the forward end point n(u) of the forward link u is null. If yes, go to Step S20421. Or otherwise, go to Step S20422. The current matching GPS point progress Mnow is expressed by:

$$Mnow = ValidN(s) + AddN$$

In the foregoing formula, ValidN(s) represents the corresponding trajectory number for the forward search end point s, and AddN represents the local added number.

S20421: Calculate a local search cost Costnow, assume a heading variable HeadDist as an Euclidean distance Euc(vp(Mnow), n(u)) between the GPS point vp (Mnow) and the forward end point n(u) of the forward link u, a local cut cost LOCcost(n(u))=HeadDist for the forward end point n(u) of the forward link u, a via link SPvia(n(u))=u for the forward end point n(u) of the forward link u, a local added trajectory Padd(n(u))=AddN for the forward end point n(u) of the forward link u, a corresponding trajectory number ValidN(n(u))=Mnow for the forward end point n(u) of the forward link u, a physical path cost SPcost(n(u))=SPcost(s)+Costnow for the forward end point n(u) of the forward link u, and a GPS point weighting cost PWcost(n(u))=PWcost(s)+PWac for the forward end point n(u) of the forward link u, insert the forward end point n(u) into the end of the modified road network point set NList, and go to Step S0425. The local search cost Costnow is expressed by:

$$Costnow = Length(u) - StartCut(s)$$

In the foregoing formula, Length(u) represents the length of the forward link u, and StartCut(s) represents the departure cut cost of the forward search end point s.

S20422: Determine whether a corresponding trajectory number ValidN(n(u)) for a forward end point n(u) of the forward link u is the corresponding trajectory number ValidN(s) of the forward search end point s. If yes, go to Step S20423. Or otherwise, and go to Step S20424 when the corresponding trajectory number ValidN(n(u)) for the forward end point n(u) of the forward link u is less than a number in the current matched GPS point progress Mnow.

S20423: Calculate a path matching cost Cost1 and a path matching cost Cost2. If the path matching cost Cost1 is less than the path matching cost Cost2, assume a heading variable HeadDist as an Euclidean distance Euc(vp(Mnow), n(u)) between the GPS point vp (Mnow) and the forward end point n(u), a local cut cost LOCcost(n(u))=HeadDist for the forward end point n(u) of the forward link u, a via link SPvia(n(u))=u for the forward end point n(u) of the forward link u, and a local added trajectory Padd(n(u))=AddN for the forward end point n(u) of the forward link u, calculate a physical path cost SPcost(n(u)) for the forward end point n(u) of the forward link u and a GPS point weighting cost PWcost(n(u)) for the forward end point n(u) of the forward link u, and go to Step S20428. The path matching cost is expressed by:

$$Cost1 = SPcost(s) + Length(u) + PWcost(s) + PWac - StartCut(s)$$

In the foregoing formula, SPcost(s) represents the physical path cost for the forward search end point s, Length(u) represents the length of the forward link u, PWcost(s) represents the GPS point weighting cost for the forward search end point s, PWac represents the local GPS point weighting variable, and StartCut(s) represents the departure cut cost of the forward search end point s.

The path matching cost Cost2 is expressed by:

$$Cost2 = SPcost(n(u)) + PWcost(n(u))$$

In the foregoing formula, SPcost(n(u)) represents the physical path cost for the forward end point n(u) of the forward link u, and PWcost(n(u)) represents the GPS point weighting cost for the forward end point n(u) of the forward link u.

The physical path cost SPcost(n(u)) for the forward end point n(u) of the forward link u is expressed by:

$$SPcost(n(u)) = SPcost(s) + Length(u) + StartCut(s)$$

In the foregoing formula, SPcost(s) represents the physical path cost for the forward search end point s, Length(u) represents the length of the forward link u, and StartCut(s) represents the departure cut cost of the forward search end point s.

The GPS point weighting cost PWcost(n(u)) for the forward end point n(u) of the forward link u is expressed by:

$$PWcost(n(u)) = PWcost(s) + PWac$$

In the foregoing formula, PWcost(s) represents the GPS point weighting cost for the forward search end point s, and PWac represents the local GPS point weighting variable.

S20424: Assume a heading variable HeadDist as an Euclidean distance Euc(vp(Mnow), n(u)) between the GPS point vp (Mnow) and the forward end point n(u) of the forward link u, calculate a local search cost Costnow, assume a local cut cost LOCcost(n(u))=HeadDist for the forward end point n(u) of the forward link u, a via link SPvia(n(u))=u for the forward end point n(u) of the forward link u, a local added trajectory Padd(n(u))=AddN for the forward end point n(u) of the forward link u, a corresponding trajectory number ValidN(n(u))=Mnow for the forward end point n(u) of the forward link u, a physical path cost SPcost(n(u))=SPcost(s)+Costnow for the forward end point n(u) of the forward link u, and a GPS point weighting cost PWcost(n(u))=PWcost(s)+PWac for the forward end point n(u) of the forward link u, and go to Step S20428. The local search cost Costnow is expressed by:

$$Costnow = Length(u) - StartCut(s)$$

In the foregoing formula, Length(u) represents the length of the forward link u, and StartCut(s) represents the departure cut cost of the forward search end point s.

S20425: When the corresponding trajectory number ValidN(n(u)) for the forward search end point s is less than the trajectory number for the end point Endp, remove the forward search end point s in the search closed road network point set CloseL, and calculate a heading variable HeadDist(n(u)). If the forward end point n(u) of the forward link u is included in the search open point set OpenL, remove the element, and determine whether the corresponding trajectory number ValidN(s) for the forward search end point s is the trajectory number for the current furthest matching point Pnow. If yes, go to Step S20426. Or otherwise, go to Step S20427 when the corresponding trajectory number ValidN(s) for the forward end point n(u) of the forward link u is less than the trajectory number for the current furthest matching point Pnow. The heading variable HeadDist(n(u)) is expressed by:

$$HeadDist(n(u)) = Euc(vp(ValidN(s)+1), n(u)) + LOCcost(n(u))$$

In the foregoing formula, Euc(vp(ValidN(s)+1),n(u)) represents the Euclidean distance between the GPS point vp(ValidN(s)) and the forward end point n(u) of the forward link u, and LOCcost(n(u)) represents the local cut cost for the forward end point n(u) of the forward link u.

S20426: Insert the forward end point n(u) of the forward link u into a start position of the search open point set OpenL, insert the heading variable HeadDist(n(u)) into a start position of the corresponding search heading reference variable set Open ValueL, insert the forward end point n(u) of the forward link u into the search closed road network point set CloseL, and go back to Step S2044.

S20427: Insert the forward end point n(u) into an end position of the search open point set OpenL, and insert the heading variable HeadDist(n(u)) into an end position of the corresponding search heading reference variable set OpenValueL. When the corresponding trajectory number ValidN(n(u)) for the forward search end point s is the trajectory number for the end point Endp, if the forward link u is included in the near link set NearL(Endp) of the GPS point vp(Endp), remove the forward search end point s from the search closed road network point set CloseL, insert the forward end point n(u) of the forward link u into the start position of the search open point set OpenL, insert 0 into the start position of the corresponding search heading reference variable set Open ValueL, insert the forward end point n(u) of the forward link u into the search closed road network point set CloseL, and go back to Step S2043.

S20428: When the corresponding trajectory number ValidN(n(u)) for the forward end point n(u) of the forward link u is less than the trajectory number for the end point Endp, calculate the heading variable HeadDist(n(u)) as an Euclidean distance Euc(vp(ValidN(n(u))+1) between the GPS point vp(ValidN(s)) and the forward end point n(u) of the forward link u and a local cut cost LOCcost(n(u)) for the forward end point n(u) of the forward link u. If the forward end point n(u) of the forward link u is included in the search open point set OpenL, remove the forward end point n(u) of the forward link u, and determine whether a corresponding trajectory number ValidN(n(u)) for a forward end point n(u) of the forward link u is greater than or equal to the trajectory number for the current furthest matching point Pnow. If yes, go to Step S20429. Or otherwise, go to Step S20430. The heading variable HeadDist(n(u)) is expressed by:

$$HeadDist(n(u)) = (vp(ValidN(n(u)) + 1) + LOCcost(n(u))$$

In the foregoing formula, (vp(ValidN(n(u))+1) represents the Euclidean distance Euc between the GPS point vp(ValidN(s)) and the forward end point n(u), and LOCcost(n(u)) represents the local cut cost for the forward end point n(u) of the forward link u.

S20429: Insert the forward end point n(u) of the forward link u into the start position of the search open point set OpenL, insert the heading variable HeadDist(n(u)) into the start position of the corresponding search heading reference variable set Open ValueL, and go back to Step S2044.

S20430: Determine whether the corresponding trajectory number ValidN(n(u)) for the forward end point n(u) of the forward link u is greater than the trajectory number for the current furthest matching point Pnow. If yes, go to Step S20431. Or otherwise, go to Step S20432 when the corresponding trajectory number ValidN(n(u)) for the forward end point n(u) of the forward link u is less than or equal to the trajectory number for the current furthest matching point Pnow.

S20431: Update the trajectory number for the current furthest matching point Pnow as the corresponding trajectory number ValidN(n(u)) for the forward end point n(u) of the forward link u, clear the search closed road network point set CloseL, insert the forward end point n(u) of the forward link u, and go back to Step S2044.

S20432: Insert the forward end point n(u) into the end position of the search open point set OpenL, and insert the heading variable HeadDist(n(u)) into the end position of the corresponding search heading reference variable set OpenValueL. When the corresponding trajectory number ValidN(n(u)) for the forward end point n(u) of the forward link u is the trajectory number for the end point Endp, if the forward link u is included in the near link set NearL(Endp) of the GPS point vp(Endp), insert the forward end point n(u) into the start position of the search open point set OpenL, insert 0 into the start position of the corresponding search heading reference variable set Open ValueL, and go back to Step S2043.

S3: Backtrack a best map matching path from the current searched end point vp(s), traverse GPS points along the path to obtain best matching results, and summarize the best matching results to output a matching result statistical table. Specifically:

S301: Backtrack a best matching path from the final point vp(k), traverse GPS points along the path, acquire elements in a search closed road network point set CloseL according to the GPS points along the path, and select a best element from the search closed road network point set CloseL as a matching path backtracking point. Specifically:

S3011: Backtrack the best matching path from the final point vp(k), traverse the GPS points along the path, and acquire the elements in the search closed road network point set CloseL according to the GPS points along the path.

S3012: Establish a circulation for each of the elements, namely road points, in the search closed road network point set CloseL, and initialize a minimum total path weighting cost MinCost as 1000000. When a corresponding trajectory number ValidN(n(u)) for a point is a trajectory number for a current furthest matching point Pnow, establish a best local path end point search iteration m=false, initialize a current road network point CrtN as a forward search end point s, and go to Step S3013.

S3013: Check whether a last element SPvia(s).last in a via link set of the forward search end point s is near the current furthest matching point Pnow. If yes, search a local best end point, and go to Step S3015. Or otherwise, go to Step S3014.

S3014: If a number SPvia(s) of elements in the via link set of the forward search end point s is not null, assume that a path backtracking end point CrtEndN is a via link SPvia(s).tail of the forward search end point s, and go back to Step S3012.

S3015: Calculate a total path cost TotalCost according to the searched path backtracking end point CrtEndN and a via link SPvia(CrtN) to which the path backtracking end point CrtEndN belongs, and determine whether the total path cost TotalCost is less than the minimum total path weighting cost MinCost. If yes, update the minimum total path weighting cost MinCost as the total path cost TotalCost and the best matching end point BestEndN as the path backtracking end point CrtEndN, go to a next alternative end point, and go back to Step S3011. Or otherwise, traverse the search closed road network point set CloseL, select a best element as the matching path backtracking point, and go to Step S302. The total path cost TotalCost is expressed by:

$$TotalCost = SPcost(CrtN) + PWcost(CrtN) + Euc(vp(Pnow), CrtN)$$

In the foregoing formula, SPcost(CrtN) represents a physical path cost set of the path backtracking end point CrtEndN, PWcost(CrtN) represents a GPS point weighting cost set of the path backtracking end point CrtEndN, and Euc(vp(Pnow),CrtN) represents an Euclidean distance between the GPS point vp(Pnow) and the path backtracking end point CrtEndN.

S302: Backtrack a matching process of a current trajectory segment according to the matching path backtracking point by taking a best matching end point BestEndN as an end point. Specifically:

S3021: Update the start point Startp as a current furthest matching point Pnow+1, initialize a current backtracking GPS point CrtP as the current furthest matching point Pnow, a current backtracking end point CrtEndN as a best matching end point BestEndN and a backtracking indicating variable BackCk as a via link SPvia (BestEndN) of the end point BestEndN, establish a backtracking iteration, and determine whether the backtracking indicating variable BackCk in the backtracking iteration is null. If yes, go to Step S3022. Or otherwise, go to Step S3023.

S3022: Check whether the start point of the path in the road network is backtracked. If yes, directly terminate the iteration, and go to Step S3023. Or otherwise, go back to Step S3021.

S3023: Establish a reverse circulation k from the current backtracking GPS point CrtP to a last start point Lastp.

S3024: When a matching result variable Match (k) is −1, if the via link SPvia(BestEndN) of the path backtracking end point BestEndN is included in a near link set NearL(k), update the matching result variable Match (k) as the via link SPvia(BestEndN) of the path backtracking end point BestEndN, and a best matching weight MatchW(k) matching weight vp(k).Weight (Match(k)) of a matched link of a point k; and When the matching result variable Match (k) is greater than −1, if the via link SPvia(CrtEndN) of the path backtracking end point CrtEndN is included in the near link set NearL(k), and a matching weight vp(k).Weight(SPvia(CrtEndN)) of the link corresponding to the point vp(k) is less than the best matching weight MatchW(k), update the matching result variable Match (k) as the via link SPvia (CrtEndN) of the path backtracking end point CrtEndN, and the best matching weight MatchW(k) as the matching weight vp(k).Weight(Match(k)) of the matched link of the point k; and if the via link SPvia(CrtEndN) of the path backtracking end point CrtEndN is not included in the near link set NearL(k), and a corresponding trajectory number for the path backtracking end point CrtEndN is less than a trajectory number for the current backtracking GPS point CrtP, update the current backtracking GPS point CrtP as a current backtracking GPS point CrtP−1;

S3025: Assume k as k−1, continue the circulation, and determine whether the circulation is terminated. If yes, go to Step S3026. Or otherwise, go back to Step S3024.

S3026: Determine whether the backtracking indicating variable BackCk is null. If no, go back to step S3023. Or otherwise, terminate the iteration to completely backtrack the matching process of the current trajectory segment with the best matching end point BestEndN as the end point, and go to step S303.

S303: Output matching results for GPS points from a GPS point vp(Lastp) to a GPS point vp(Pnow) according to a backtracking result of the current matched trajectory segment, and clear a via link set SPvia, a physical path cost set SPcost, a local cut cost set LOCcost, a GPS point weighting cost set PWcost, a local added trajectory set Padd, a corresponding trajectory number set ValidN and a departure cut cost set StartCut of each of road network points in the modified road network point set NList.

S304: Determine whether a trajectory number for a start point Startp is greater than a trajectory number for an end point Endp. If yes, determine that current traveling GPS points are matched completely, and summarize the matching results to output the matching result statistical table, and go to Step S4. Or otherwise, go to Step S4 when the trajectory number for the start point Startp is less than the trajectory number for the end point Endp.

S4: Determine, according to the matching result statistical table, whether the current searched end point vp(s) is a final point vp(k). If yes, complete efficient map matching for a GPS trajectory. Or otherwise, take a point vp(s+1) as a first point for map matching, and go back to Step S2. Specifically:

S401: Determine, according to the matching result statistical table, whether the current searched end point vp(s) is the final point vp(k). If yes, complete the efficient map matching for the GPS trajectory. Or otherwise, take the point vp(s+1) as the first point for the map matching, and go back to Step S402.

S402: Output matching results from the first point vp(1) to the interruption point vp(s), and execute Steps S2-S3 from the next point vp(s+1) to the final point vp(k) until the efficient map matching for the GPS trajectory is completed.

Figure 2:
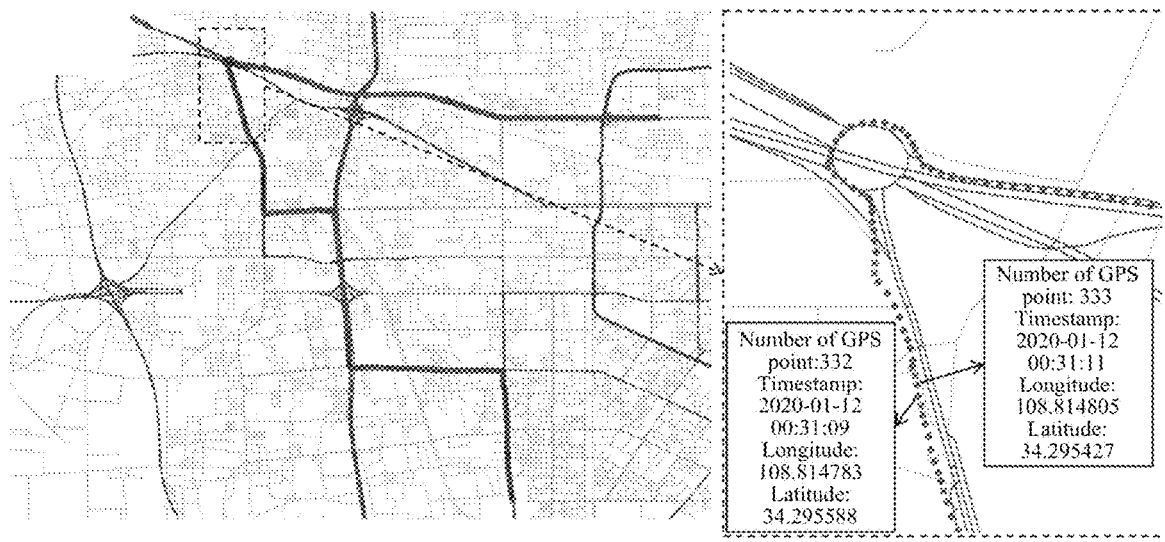
FIG. 2 is a schematic view illustrating experimental data according to an embodiment.
Figure 2:
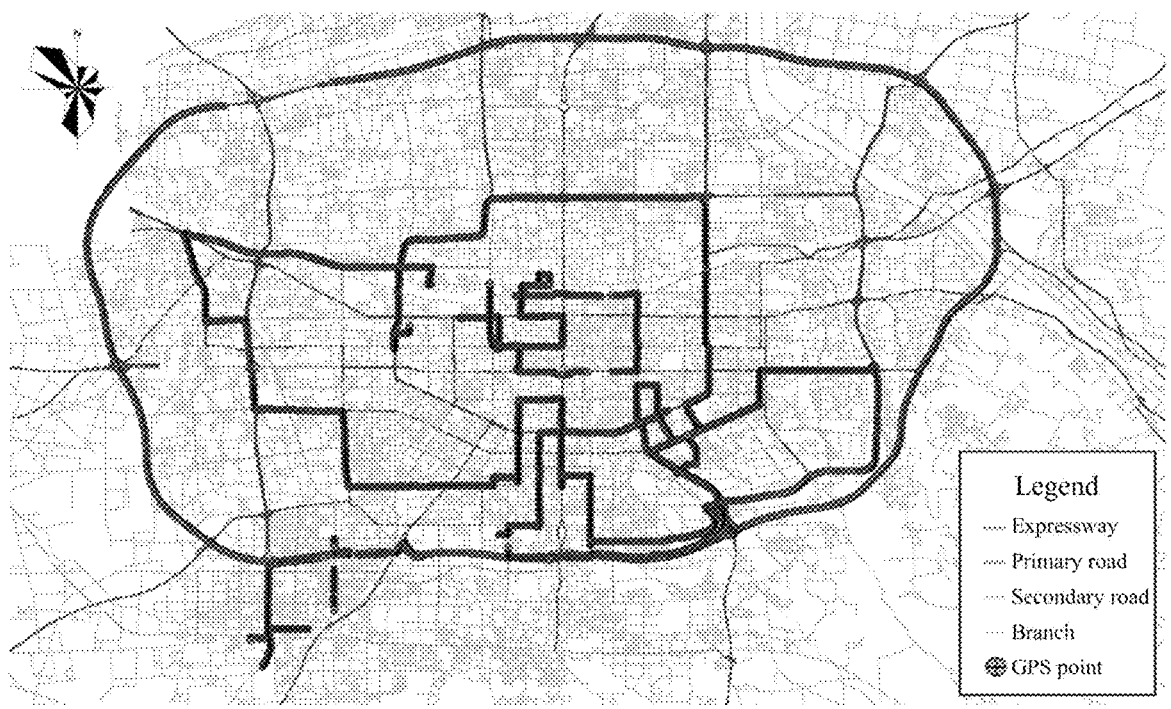

In the embodiment, GPS trajectory data (234 km, 26 segments, and 10445 points) was acquired manually with a "GOSkit" on Jan. 11, 2020 in Xi'an for matching verification. As shown in FIG. 2, FIG. 2 illustrates a distribution map of experimental data.

Figure 3:
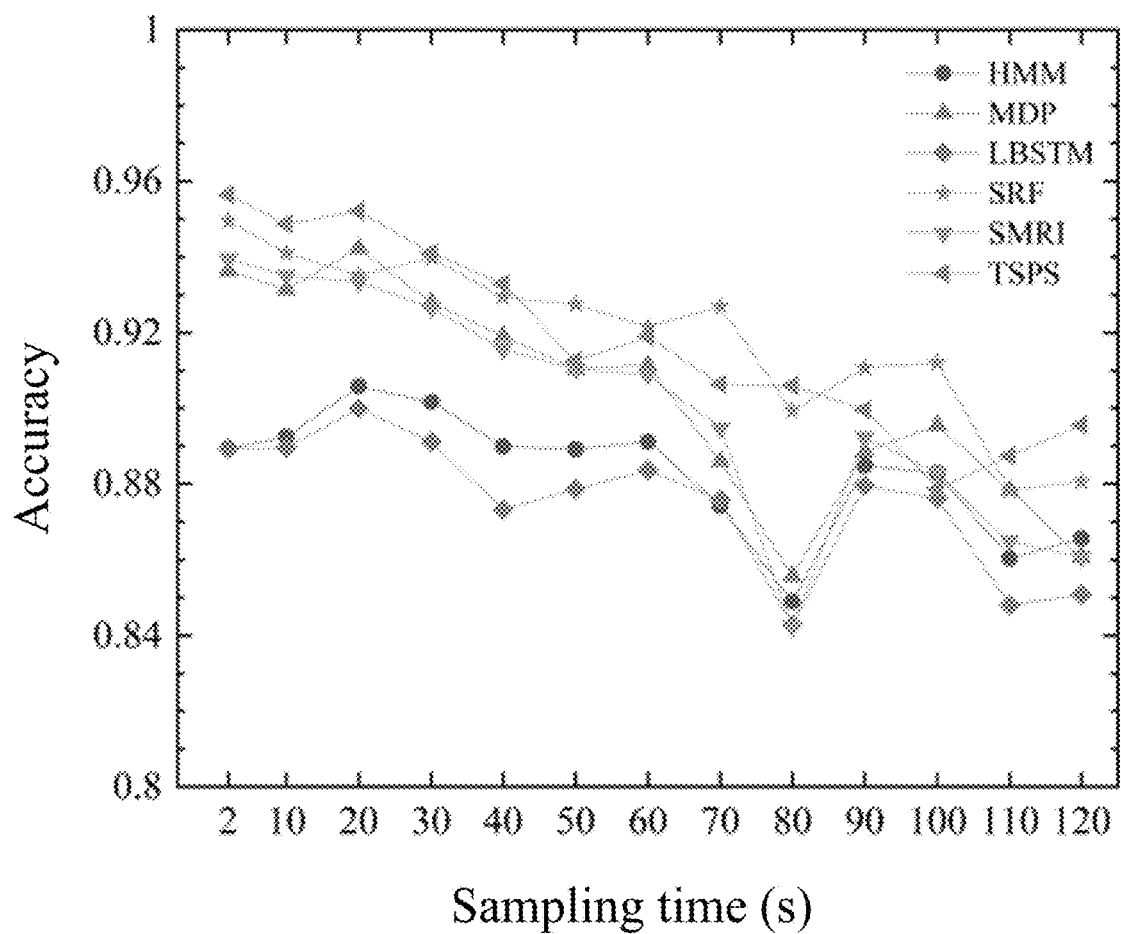
FIG. 3 is a comparison diagram of a matching precision according to an embodiment.
Figure 4:
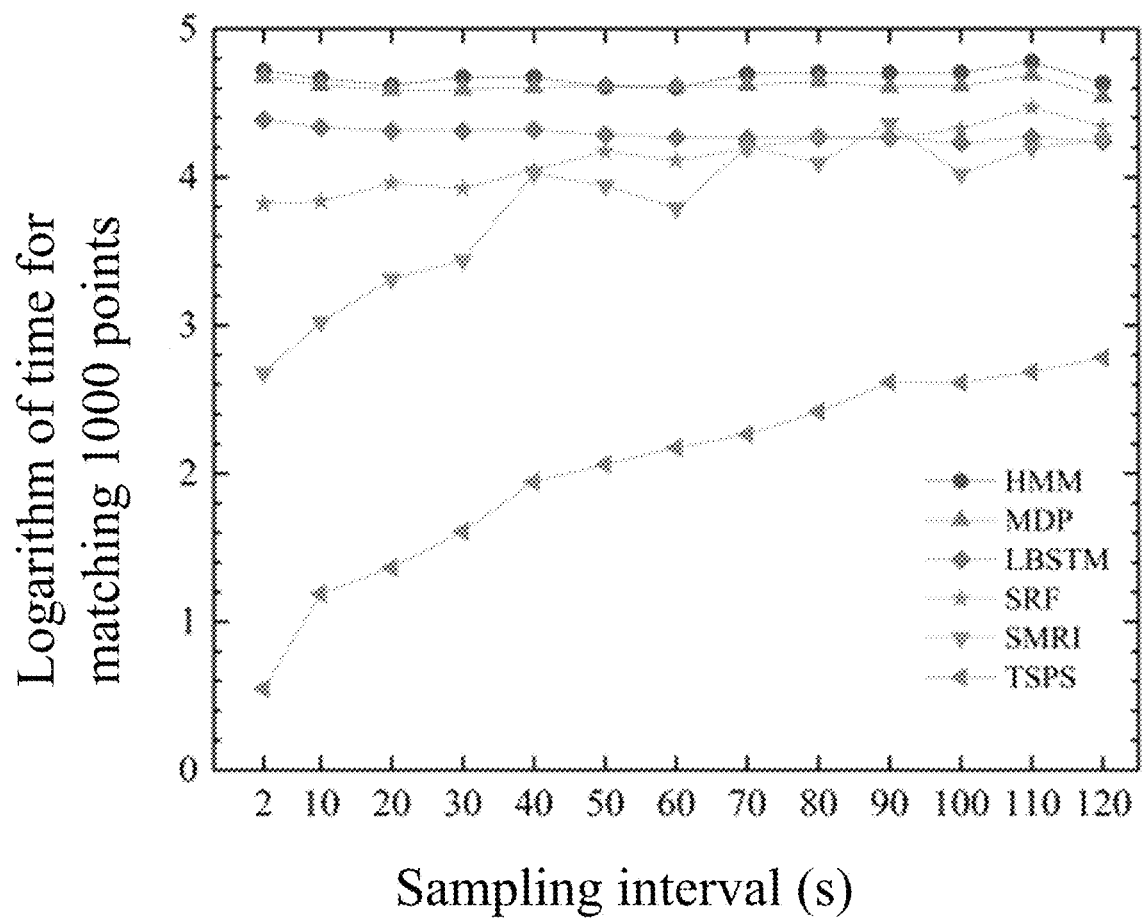
FIG. 4 is a comparison diagram of a matching speed according to an embodiment.

In the embodiment, there are four stepwise matching algorithms such as the STM, HMM, MDP and LBMM, and two segment-wise matching algorithms such as the segment-wise matching based on magnetic resonance imaging (MRI) SMRI, and segment-wise matching based on route features (SRF). As shown in FIG. 3 and FIG. 4, FIG. 3 illustrates a comparison curve in matching precision, and FIG. 4 is a comparison curve in matching speed. The precision is a ratio of a number of correctly matched points to a number of all points. The speed is a logarithmic value with a base of 10 of matching time (s) required by one thousand points.

In the embodiment, based on a "path searching and spatial point weighting" logic, the present disclosure replaces the conventional "GPS point guided path search logic" with the reliable and efficient "path search guided GPS point matching logic", avoids the complicated and inefficient map data calling process in the conventional matching logic, solves the problem of endless loop in backtracking of the emerging algorithm, and greatly improves the map matching efficiency.

The foregoing embodiments are provided merely for an objective of describing the present disclosure and are not intended to limit the scope of the present disclosure. The scope of the present disclosure is defined by the appended claims. Various equivalent replacements and modifications made without departing from the spirit and scope of the present disclosure should all fall within the scope of the present disclosure.

What is claimed is:

1. An efficient map matching method for a global positioning system (GPS) trajectory, comprising the following steps:

S1: acquiring a plurality of GPS points through which a GPS of a vehicle passes, and initializing the plurality of GPS points to obtain a valid GPS point list VP={vp(1), vp(2), ..., vp(k)};

S2: establishing map matching work from a first point vp(1) in the valid GPS point list VP={vp(1), vp(2), ..., vp(k)} for forward iteration, and obtaining a current searched end point vp(s) with a GPS point guided path search algorithm, wherein the forward iteration is to perform point-by-point iteration from the first point vp(1) to backwardly search a matching path;

S3: backtracking a best map matching path from the current searched end point vp(s), traversing GPS points along the path to obtain best matching results, and summarizing the best matching results to output a matching result statistical table;

S4: determining, according to the matching result statistical table, whether the current searched end point vp(s) is a final point vp(k); completing efficient map matching for a GPS trajectory if yes; or otherwise, taking a point vp(s+1) as a first point for map matching, and going back to step S2; and S5: according to the efficient map matching for the GPS trajectory, mapping GPS real-time trajectory information to a traffic network to obtain spatio-temporal traffic information and an operation state of regional transportation accurately.

2. The efficient map matching method for a GPS trajectory according to claim 1, wherein step S1 comprises the following steps:

S101: acquiring the plurality of GPS points through which the GPS of the vehicle passes;

S102: separating the plurality of GPS points into a segment set Trip(a)={T1, T2, ..., Ta, ..., Tn}, wherein Ta represents a segment, the segment Ta comprises a plurality of GPS points, and Tn represents a total number of segments;

S103: selecting a GPS point p(i) from the plurality of GPS points {p(1), p(2), ..., p(i), ..., p(n)} in the segment Ta as a current GPS point, wherein p(n) represents a total number of the GPS points;

S104: determining whether a linear speed from the current GPS point p(i) to a GPS point p(i+1) is greater than 300 km/h; removing, if yes, the current GPS point p(i), going to the next GPS point p(i+1), and repeating step S104; or otherwise, going to step S105; or determining whether an interval between the current GPS point p(i) and the GPS point p(i+1) is less than or equal to 0; removing, if yes, the current GPS point p(i), going to the next GPS point p(i+1), and repeating step S104; or otherwise, going to step S105;

S105: setting a last cumulative travel distance variable of the current GPS point as p(i).lastD;

S106: determining whether the p(i).lastD is less than 20 m; calculating, if yes, a distance from a GPS point p(i−1) to the GPS point p(i), removing the GPS point p(i), and going to step S107; or otherwise, incorporating, when the p(i).lastD is greater than 20 m, the current GPS point p(i)=vp(l) into the valid GPS point list VP={vp(1), vp(2), ..., vp(k)}, and going to step S107; and S107: determining whether all of the GPS points in the segment Ta is taken as the current GPS point respectively; establishing, if yes, the valid GPS point list VP={vp(1), vp(2), ..., vp(k)}, acquiring a to-be-matched near link set NearL (k) in map data for each of GPS points k in the GPS point list VP={vp(1), vp(2), ..., vp(k)}, initializing a matching result variable Match (k)=−1, and a best matching weight MatchW(k)=10000, thereby completing establishment of the valid GPS point list VP={vp(1), vp(2), ..., vp(k)}, and going to step S2; or otherwise, going back to step S101.

3. The efficient map matching method for a GPS trajectory according to claim 1, wherein step S2 comprises the following steps:

S201: establishing the map matching work from the first point vp(1) in the valid GPS point list VP={vp(1), vp(2), ..., vp(k)} for the forward iteration;

S202: performing the forward iteration according to the map matching work, and setting a start point Startp and an end point Endp in the valid GPS point list VP={vp(1), vp(2), ..., vp(k)};

S203: determining whether a trajectory number for the start point Startp is less than or equal to a trajectory number for the end point Endp; going to step S204 if yes; or otherwise, matching a GPS trajectory completely to obtain a best map matching path from the first point vp(1) to the final point vp(k), and going to step S3; and S204: searching a shortest path from the start point Startp to the end point Endp with the GPS point guided path search algorithm, and determining whether an iteration process for path search is terminated; acquiring, if yes, an alternative path, and going to step S3; or otherwise, repeating step S204 until the iteration for the path search is terminated.

4. The efficient map matching method for a GPS trajectory according to claim 3, wherein step S204 comprises the following steps:

S2041: initializing matching variables of the start point Startp, the matching variables comprising a last start point Lastp being initialized as the start point Startp, a current furthest matching point Pnow, a modified road network point set NList, a search open point set OpenL, a corresponding search heading reference variable set OpenValueL, a search closed road network point set CloseL and a start point near road network link set NearL (Startp);

S2042: establishing the map matching work on each of links in the start point near road network link set NearL (Startp) for a circulation;

S2043: determining whether the link satisfies a departure condition; incorporating, if yes, a corresponding end point of the link into the search open point set OpenL, respectively updating the corresponding search heading reference variable set OpenValueL, the modified road network point set NList as well as a search attribute set Search(s) of a forward search end point s corresponding to the link, and going to step S2044 when the circulation is terminated, and the search open point set OpenL is not null; or otherwise, selecting a near link with a maximum matching value as a matching result of the start point Startp, updating the start point Startp as a start point Startp+1, and going back to step S202, the search attribute set Search(s) of the end point comprising a departure cut cost StartCut(s), a physical path cost SPcost(s), a local cut cost LOCcost(s), a GPS point weighting cost PWcost(s), a corresponding trajectory number ValidN(s), a local added trajectory Padd(s), and a via link SPvia(s);

S2044: establishing an iteration on the forward search end point s in the search open point set OpenL, and determining whether the search open point set OpenL is null upon completion of the iteration; acquiring, if yes, an alternative path, and going to step S3; or otherwise, going to step S2045;

S2045: selecting a first forward search end point s in the search open point set OpenL for search, respectively acquiring a corresponding trajectory number ValidN(s) and a corresponding search heading reference variable OpenValueL value OpenValueL.begin of the forward search end point s, and determining whether the corresponding trajectory number ValidN(s) is greater than a trajectory number for a start point Startp−1; removing, if yes, the forward search end point s and a corresponding heading variable HeadDist from the search open point set OpenL and a first corresponding search heading reference variable set OpenValueL corresponding to the forward search end point s, and going to step S2046; or otherwise, going to step S2048;

S2046: calculating, if the corresponding trajectory number ValidN(s) is less than the trajectory number for the end point Endp, and the corresponding trajectory number ValidN(s) is less than a trajectory number for the current furthest matching point Pnow, a heading judgment distance Jdist, and going to step S2047; or calculating, if the corresponding trajectory number ValidN(s) is less than the trajectory number for the end point Endp, and the local added trajectory Padd(s)=0, the heading judgment distance Jdist, and going to step S2047;

S2047: determining whether the corresponding search heading reference variable value OpenValueL(s) of the forward search end point s is greater than 2*the heading judgment distance Jdist, and the heading judgment distance Jdist is greater than 250 m; going to step S2045 if yes; or otherwise, going to step S2048; or determining whether the corresponding search heading reference variable OpenValueL(s) of the forward search end point s is greater than 450 m, and the heading judgment distance Jdist is less than or equal to 250 m; going to step S2045 if yes; or otherwise, going to step S2048;

S2048: establishing a circulation for a forward link set ForwardL of the current forward search end point s, and extracting a forward link u and a next road network point n(u); going to, when a via link SPvia(s) is not null, if the via link SPvia(s) of the forward search end point s is the forward link u, a next forward link in the forward link set ForwardL, and continuously calculating a moving angle MoveAng(u) between the forward link u and a GPS point vp (ValidN(s));

S2049: determining whether the moving angle MoveAng (u) is greater than or equal to 100°; going to, if yes, the next forward link u in the forward link set ForwardL, and going back to step S2048; or otherwise, inserting the forward link u into an extended link set NextL according to the moving angle MoveAng(u) in an ascending manner, and going to step S20410 upon completion of the circulation;

S20410: establishing a forward search circulation on elements in the extended link set NextL, extracting a forward link u and a next road network point n(u), and initializing a local GPS point weighting variable PWac=0, a matched GPS point number Sernow=corresponding trajectory number ValidN(s), a local added number AddN=0 and a turnaround indicating variable TurnIndi=false;

S20411: initializing, when the matched GPS point number Sernow is less than the trajectory number for the end point Endp, an iteration indicating variable Indi=true, establishing a forward trajectory matching gain, and determining whether the iteration indicating variable Indi=false upon completion of the iteration; going to step S20412 if yes; or otherwise, going to step S20415;

S20412: setting the matched GPS point number Sernow as a matched GPS point number Sernow+1, searching a forward link u in a near link set NearL (Sernow) of a GPS point vp (Sernow), and determining whether the forward link u is not comprised in the near link set NearL (Sernow) of the GPS point vp (Sernow); going to step S20413 if yes; or otherwise, going to step S20414; or setting the matched GPS point number Sernow as the matched GPS point number Sernow+1, searching the forward link u in the near link set NearL (Sernow) of the GPS point vp (Sernow), and determining whether the iteration indicating variable Indi=false upon completion of the iteration when the matched GPS point number is the trajectory number for the end point Endp; going to step S20413 if yes; or otherwise, going to step S20414;

S20413: determining whether the local added number AddN=0; going to step S20415 if yes; or otherwise, going to step S20416 when the local added number AddN is greater than 0;

S20414: setting the local added number AddN as a local added number AddN+1, the local GPS point weighting variable PWac as PWac+(Sernow).Weight(u), the turnaround indicating variable TurnIndi=true if the GPS point has a turnaround, and the iteration indicating variable Indi=false; going to step S20415 when the local added number AddN=0, and determining whether the local added number AddN is greater than 0; going to step S20421 if yes; or otherwise, going back to step S20412, wherein vp(Sernow).Weight(u) represents the GPS point vp;

S20415: determining, when the trajectory number for the forward search end point s is greater than the trajectory number for the start point Startp, whether a corresponding trajectory number ValidN(n(u)) for a forward end point n(u) of the forward link u is null; going to step S20416 if yes; or otherwise, going back to step S20417;

S20416: calculating a local search cost Costnow, setting a local cut cost LOCcost(n(u))=Costnow for the forward end point n(u) of the forward link u, a via link SPvia(n(u))=u for the forward end point n(u) of the forward link u, a local added trajectory Padd(n(u))=0 for the forward end point n(u) of the forward link u, a physical path cost SPcost(n(u))=SPcost(s)+Length(u) for the forward end point n(u) of the forward link u, and a GPS point weighting cost PWcost(n(u))=PWac for the forward end point n(u) of the forward link u, inserting the forward end point n(u) into an end of the modified road network point set NList, and going to step S20419, wherein the local search cost Costnow is expressed by:

$$Costnow = LOCcost(s)+Length(u)$$

wherein, LOCcost(s) represents the local cut cost for the forward search end point s, and Length (u) represents a length of the forward link u;

S20417: determining whether the corresponding trajectory number ValidN(n(u)) for the forward end point n(u) of the forward link u is the corresponding trajectory number ValidN(s) for the forward search end point s; going to step S20418 if yes; or otherwise, going to step S20419 when the corresponding trajectory number ValidN(n(u)) for the forward end point n(u) of the forward link u is less than the corresponding trajectory number ValidN(s) for the forward search end point s;

S20418: calculating a path matching cost Cost1 according to the corresponding trajectory number ValidN(n(u)) for the forward end point n(u) of the forward link u, calculating, according to the corresponding trajectory number ValidN(n(u)) for the forward end point n(u) of the forward link u if the path matching cost Cost1 is less than a path matching cost Cost2, a local cut cost LOCcost(n(u)) for the forward end point n(u) of the forward link u, setting a via link SPvia(n(u))=u for the forward end point n(u) of the forward link u and a local added trajectory Padd(n(u))=0 for the forward end point n(u) of the forward link u, calculating a physical path cost SPcost(n(u)) for the forward end point n(u) of the forward link u and setting that a GPS point weighting cost PWcost(n(u)) for the forward end point n(u) of the forward link u equal to the GPS point weighting cost PWcost(s) for the forward search end point s, and going to step S20420, wherein the path matching cost is expressed by:

$$Cost1 = SPcost(s) + \text{Length}(u) + PWcost(s)$$

wherein, SPcost(s) represents the physical path cost for the forward search end point s, Length (u) represents the length of the forward link u, and PWcost(s) represents the GPS point weighting cost for the forward search end point s;

the path matching cost Cost2 is expressed by:

$$Cost2 = SPcost(n(u)) + PWcost(n(u))$$

wherein, SPcost(n(u)) represents the physical path cost for the forward end point n(u) of the forward link u, and PWcost(n(u)) represents the GPS point weighting cost for the forward end point n(u) of the forward link u;

the local cut cost LOCcost(n(u)) for the forward end point n(u) of the forward link u is expressed by:

$$LOCcost(n(u)) = LOCcost(s) + \text{Length}(u)$$

wherein, LOCcost(s) represents the local cut cost for the forward search end point s, and Length (u) represents the length of the forward link u; and $$SPcost(n(u)) = SPcost(s) + \text{Length}(u)$$

wherein, SPcost(s) represents the physical path cost for the forward search end point s, and Length (u) represents the length of the forward link u;

S20419: calculating a heading variable HeadDist according to the local cut cost LOCcost(n(u)) for the forward search end point s and the length Length(u) of the forward link u, setting a local cut cost LOCcost(n(u))=HeadDist for the forward end point n(u) of the forward link u, a via link SPvia(n(u))=u for the forward end point n(u) of the forward link u, a local added trajectory Padd(n(u))=0 for the forward end point n(u) of the forward link u, a corresponding trajectory number ValidN(n(u))=ValidN(s) for the forward end point n(u) of the forward link u, a physical path cost SPcost(n(u))=SPcost(s)+Length (u) for the forward end point n(u) of the forward link u, and a GPS point weighting cost PWcost(n(u))=PWcost(s) for the forward end point n(u) of the forward link u, and going to Step S20425, wherein the heading variable HeadDist is expressed by:

$$HeadDist = LOCcost(s) + \text{Length}(u)$$

wherein, LOCcost(s) represents the local cut cost for the forward search end point s, and Length(u) represents the length of the forward link u;

S20420: calculating a current matching GPS point progress Mnow according to the corresponding trajectory number ValidN(s) for the forward search end point s, and determining whether the corresponding trajectory number ValidN(n(u)) for the forward end point n(u) of the forward link u is null; going to step S20421 if yes; or otherwise, going to step S20422, wherein the current matching GPS point progress Mnow is expressed by:

$$Mnow = ValidN(s) + AddN$$

wherein, ValidN(s) represents the corresponding trajectory number for the forward search end point s, and AddN represents the local added number;

S20421: calculating a local search cost Costnow, setting a heading variable HeadDist as an Euclidean distance Euc(vp(Mnow), n(u)) between the GPS point vp (Mnow) and the forward end point n(u) of the forward link u, a local cut cost LOCcost(n(u))=HeadDist for the forward end point n(u) of the forward link u, a via link SPvia(n(u))=u for the forward end point n(u) of the forward link u, a local added trajectory Padd(n(u))=AddN for the forward end point n(u) of the forward link u, a corresponding trajectory number ValidN(n(u))=Mnow for the forward end point n(u) of the forward link u, a physical path cost SPcost(n(u))=SPcost(s)+Costnow for the forward end point n(u) of the forward link u, and a GPS point weighting cost PWcost(n(u))=PWcost(s)+PWac for the forward end point n(u) of the forward link u, inserting the forward end point n(u) into the end of the modified road network point set NList, and going to step S0425, wherein the local search cost Costnow is expressed by:

$$Costnow = \text{Length}(u) - StartCut(s)$$

wherein, Length (u) represents the length of the forward link u, and StartCut(s) represents the departure cut cost of the forward search end point s;

S20422: determining whether a corresponding trajectory number ValidN(n(u)) for a forward end point n(u) of the forward link u is the corresponding trajectory number ValidN(s) of the forward search end point s; going to step S20423 if yes; or otherwise, going to step S20424 when the corresponding trajectory number ValidN(n(u)) for the forward end point n(u) of the forward link u is less than a number in the current matched GPS point progress Mnow;

S20423: calculating a path matching cost Cost1 and a path matching cost Cost2; setting, if the path matching cost Cost1 is less than the path matching cost Cost2, a heading variable HeadDist as an Euclidean distance Euc(vp(Mnow), n(u)) between the GPS point vp(Mnow) and the forward end point n(u), a local cut cost LOCcost(n(u))=HeadDist for the forward end point n(u) of the forward link u, a via link SPvia(n(u))=u for the forward end point n(u) of the forward link u, and a local added trajectory Padd(n(u))=AddN for the forward end point n(u) of the forward link u, calculating a physical path cost SPcost(n(u)) for the forward end point n(u) of the forward link u and a GPS point weighting cost PWcost(n(u)) for the forward end point n(u) of the forward link u, and going to step S20428, wherein the path matching cost is expressed by:

$$Cost1 = SPcost(s) + \text{Length}(u) + PWcost(s) + PWac - StartCut(s)$$

wherein, SPcost(s) represents the physical path cost for the forward search end point s, Length(u) represents the length of the forward link u, PWcost(s) represents the GPS point weighting cost for the forward search end point s, PWac represents the local GPS point weighting variable, and StartCut(s) represents the departure cut cost of the forward search end point s;
the physical path cost SPcost(n(u)) for the forward end point n(u) of the forward link u is expressed by:

$$SPcost(n(u)) = SPcost(s) + \text{Length}(u) + StartCut(s)$$

wherein, SPcost(s) represents the physical path cost for the forward search end point s, Length(u) represents the length of the forward link u, and StartCut(s) represents the departure cut cost of the forward search end point s; and
the GPS point weighting cost PWcost(n(u)) for the forward end point n(u) of the forward link u is expressed by:

$$PWcost(n(u)) = PWcost(s) + PWac$$

wherein, PWcost(s) represents the GPS point weighting cost for the forward search end point s, and PWac represents the local GPS point weighting variable;

S20424: setting a heading variable HeadDist as an Euclidean distance Euc(vp(Mnow), n(u)) between the GPS point vp(Mnow) and the forward end point n(u) of the forward link u, calculating a local search cost Costnow, setting a local cut cost LOCcost(n(u))=HeadDist for the forward end point n(u) of the forward link u, a via link SPvia(n(u))=u for the forward end point n(u) of the forward link u, a local added trajectory Padd(n(u))=AddN for the forward end point n(u) of the forward link u, a corresponding trajectory number ValidN(n(u))=Mnow for the forward end point n(u) of the forward link u, a physical path cost SPcost(n(u))=SPcost(s)+Costnow for the forward end point n(u) of the forward link u, and a GPS point weighting cost PWcost(n(u))=PWcost(s)+PWac for the forward end point n(u) of the forward link u, and going to step S20428, wherein the local search cost Costnow is expressed by:

$$Costnow = \text{Length}(u) - StartCut(s)$$

wherein, Length (u) represents the length of the forward link u, and StartCut(s) represents the departure cut cost of the forward search end point s;

S20425: removing, when the corresponding trajectory number ValidN(n(u)) for the forward search end point s is less than the trajectory number for the end point Endp, the forward search end point s in the search closed road network point set CloseL, and calculating a heading variable HeadDist(n(u)); removing, if the forward end point n(u) of the forward link u is comprised in the search open point set OpenL, the element, and determining whether the corresponding trajectory number ValidN(s) for the forward search end point s is the trajectory number for the current furthest matching point Pnow; going to step S20426 if yes; or otherwise, going to Step S20427 when the corresponding trajectory number ValidN(s) for the forward end point n(u) of the forward link u is less than the trajectory number for the current furthest matching point Pnow, wherein the heading variable HeadDist(n(u)) is expressed by:

$$HeadDist(n(u)) = Euc(vp(ValidN(s) + 1), n(u)) + LOCcost(n(u))$$

wherein, Euc(vp(ValidN(s)+1), n(u)) represents the Euclidean distance between the GPS point vp(ValidN(s)) and the forward end point n(u) of the forward link u, and LOCcost(n(u)) represents the local cut cost for the forward end point n(u) of the forward link u;

S20426: inserting the forward end point n(u) of the forward link u into a start position of the search open point set OpenL, inserting the heading variable HeadDist(n(u)) into a start position of the corresponding search heading reference variable set OpenValueL, inserting the forward end point n(u) of the forward link u into the search closed road network point set CloseL, and going back to step S2044;

S20427: inserting the forward end point n(u) into an end position of the search open point set OpenL, and inserting the heading variable HeadDist(n(u)) into an end position of the corresponding search heading reference variable set OpenValueL; removing, when the corresponding trajectory number ValidN(n(u)) for the forward search end point s is the trajectory number for the end point Endp, if the forward link u is comprised in the near link set NearL(Endp) of the GPS point vp(Endp), the forward search end point s from the search closed road network point set CloseL, inserting the forward end point n(u) of the forward link u into the start position of the search open point set OpenL, inserting 0 into the start position of the corresponding search heading reference variable set OpenValueL, inserting the forward end point n(u) of the forward link u into the search closed road network point set CloseL, and going back to step S2043;

S20428: calculating, when the corresponding trajectory number ValidN(n(u)) for the forward end point n(u) of the forward link u is less than the trajectory number for the end point Endp, the heading variable HeadDist(n(u)) as an Euclidean distance Euc(vp (ValidN(n(u))+1) between the GPS point vp(ValidN(s)) and the forward end point n(u) of the forward link u and a local cut cost LOCcost(n(u)) for the forward end point n(u) of the forward link u; removing, if the forward end point n(u) of the forward link u is comprised in the search open point set OpenL, the forward end point n(u) of the forward link u, and determining whether a corresponding trajectory number ValidN(n(u)) for a forward end point n(u) of the forward link u is greater than or equal to the trajectory number for the current furthest matching point Pnow; going to step S20429 if yes; or otherwise, going to step S20430, wherein the heading variable HeadDist(n(u)) is expressed by:

$$HeadDist(n(u)) = (vp(ValidN(n(u))+1) + LOCcost(n(u))$$

wherein, (vp(ValidN(n(u))+1) represents the Euclidean distance Euc between the GPS point vp(ValidN(s)) and the forward end point n(u), and LOCcost(n(u)) represents the local cut cost for the forward end point n(u) of the forward link u;

S20429: inserting the forward end point n(u) of the forward link u into the start position of the search open point set OpenL, inserting the heading variable HeadDist(n(u)) into the start position of the corresponding search heading reference variable set OpenValueL, and going back to step S2044;

S20430: determining whether the corresponding trajectory number ValidN(n(u)) for the forward end point n(u) of the forward link u is greater than the trajectory number for the current furthest matching point Pnow; going to step S20431 if yes; or otherwise, going to step S20432 when the corresponding trajectory number ValidN(n(u)) for the forward end point n(u) of the forward link u is less than or equal to the trajectory number for the current furthest matching point Pnow;

S20431: updating the trajectory number for the current furthest matching point Pnow as the corresponding trajectory number ValidN(n(u)) for the forward end point n(u) of the forward link u, clearing the search closed road network point set CloseL, inserting the forward end point n(u) of the forward link u, and going back to step S2044; and S20432: inserting the forward end point n(u) into the end position of the search open point set OpenL, and inserting the heading variable HeadDist(n(u)) into the end position of the corresponding search heading reference variable set OpenValueL; inserting, when the corresponding trajectory number ValidN(n(u)) for the forward end point n(u) of the forward link u is the trajectory number for the end point Endp, if the forward link u is comprised in the near link set NearL (Endp) of the GPS point vp(Endp), the forward end point n(u) into the start position of the search open point set OpenL, inserting 0 into the start position of the corresponding search heading reference variable set OpenValueL, and going back to step S2043.

5. The efficient map matching method for a GPS trajectory according to claim 1, wherein step S3 comprises the following steps:

S301: backtracking a best matching path from the final point vp(k), traversing GPS points along the path, acquiring elements in a search closed road network point set CloseL according to the GPS points along the path, and selecting a best element from the search closed road network point set CloseL as a matching path backtracking point;

S302: backtracking a matching process of a current trajectory segment according to the matching path backtracking point by taking a best matching end point BestEndN as an end point;

S303: outputting matching results of GPS points from a GPS point vp(Lastp) to a GPS point vp(Pnow) according to a backtracking result of the current matched trajectory segment, and clearing a via link SPvia, a physical path cost SPcost, a local cut cost LOCcost, a GPS point weighting cost PWcost, a local added trajectory Padd, a corresponding trajectory number ValidN and a departure cut cost StartCut of each of road network points in the modified road network point set NList; and S304: determining whether a trajectory number for a start point Startp is greater than a trajectory number for an end point Endp; determining, if yes, that current traveling GPS points are matched completely, and summarizing the matching results to output the matching result statistical table, and going to step S4; or otherwise, going to step S4 when the trajectory number for the start point Startp is less than the trajectory number for the end point Endp.

6. The efficient map matching method for a GPS trajectory according to claim 5, wherein step S301 comprises the following steps:

S3011: backtracking the best matching path from the final point vp(k), traversing the GPS points along the path, and acquiring the elements in the search closed road network point set CloseL according to the GPS points along the path;

S3012: establishing a circulation for each of the elements, namely road points, in the search closed road network point set CloseL, and initializing a minimum total path weighting cost MinCost as 1000000; and establishing, when a corresponding trajectory number ValidN(n(u)) for a point is a trajectory number for a current furthest matching point Pnow, a best local path end point search iteration m=false, initializing a current road network point CrtN as a forward search end point s, and going to step S3013;

S3013: checking whether a last element SPvia(s).last in a via link set of the forward search end point s is near the current furthest matching point Pnow; searching, if yes, a local best end point, and going to step S3015; or otherwise, going to step S3014;

S3014: setting, if a number SPvia(s) of elements in the via link set of the forward search end point s is not null, that a path backtracking end point CrtEndN is a via link SPvia(s).tail of the forward search end point s, and going back to step S3012; and S3015: calculating a total path cost TotalCost according to the searched path backtracking end point CrtEndN and a via link SPvia(CrtN) to which the path backtracking end point CrtEndN belongs, and determining whether the total path cost TotalCost is less than the minimum total path weighting cost MinCost; updating, if yes, the minimum total path weighting cost MinCost as the total path cost TotalCost and the best matching end point BestEndN as the path backtracking end point CrtEndN, going to a next alternative end point, and going back to step S3011; or otherwise, traversing the search closed road network point set CloseL, selecting a best element as the matching path backtracking point, and going to step S302, wherein the total path cost TotalCost is expressed by:

$$TotalCost = SPcost(CrtN) + PWcost(CrtN) + Euc(vp(Pnow), CrtN)$$

wherein, SPcost(CrtN) represents a physical path cost set of the path backtracking end point CrtEndN, PWcost (CrtN) represents a GPS point weighting cost set of the path backtracking end point CrtEndN, and Euc(vp (Pnow),CrtN) represents an Euclidean distance between the GPS point vp(Pnow) and the path backtracking end point CrtEndN.

7. The efficient map matching method for a GPS trajectory according to claim 5, wherein step S302 comprises the following steps:
S3021: updating the start point Startp as a current furthest matching point Pnow+1, initializing a current backtracking GPS point CrtP as the current furthest matching point Pnow, a current backtracking end point CrtEndN as the best matching end point BestEndN and a backtracking indicating variable BackCk as a via link SPvia (BestEndN) of the end point BestEndN, establishing a backtracking iteration, and determining whether the backtracking indicating variable BackCk in the backtracking iteration is null; going to step S3022 if yes; or otherwise, going to step S3023;
S3022: checking whether the start point of the path in the road network is backtracked; directly terminating, if yes, the iteration, and going to step S3023; or otherwise, going back to step S3021;
S3023: establishing a reverse circulation k from the current backtracking GPS point CrtP to a last start point Lastp;
S3024: updating, when a matching result variable Match (k) is −1, if the via link SPvia(BestEndN) of the path backtracking end point BestEndN is comprised in a near link set NearL(k), the matching result variable Match (k) as the via link SPvia(BestEndN) of the path backtracking end point BestEndN, and a best matching weight MatchW(k) as a matching weight vp(k).Weight (Match(k)) of a matched link of a point k; and
updating, when the matching result variable Match (k) is greater than −1, if the via link SPvia(CrtEndN) of the path backtracking end point CrtEndN is comprised in the near link set NearL(k), and a matching weight vp(k).Weight(SPvia(CrtEndN)) of the link corresponding to the point vp(k) is less than the best matching weight MatchW(k), the matching result variable Match (k) as the via link SPvia (CrtEndN) of the path backtracking end point CrtEndN, and the best matching weight MatchW(k) as the matching weight vp(k).Weight(Match(k)) of the matched link of the point k; and updating, if the via link SPvia(CrtEndN) of the path backtracking end point CrtEndN is not comprised in the near link set NearL(k), and a corresponding trajectory number for the path backtracking end point CrtEndN is less than a trajectory number for the current backtracking GPS point CrtP, the current backtracking GPS point CrtP as a current backtracking GPS point CrtP−1;
S3025: setting k as k−1, continuing the circulation, and determining whether the circulation is terminated; going to step S3026 if yes; or otherwise, going back to step S3024; and
S3026: determining whether the backtracking indicating variable BackCk is null; going back to step S3023 if no; or otherwise, terminating the iteration to completely backtrack the matching process of the current trajectory segment with the best matching end point BestEndN as the end point, and going to step S303.

8. The efficient map matching method for a GPS trajectory according to claim 1, wherein step S4 comprises the following steps:
S401: determining, according to the matching result statistical table, whether the current searched end point vp(s) is the final point vp(k); completing the efficient map matching for the GPS trajectory if yes; or otherwise, taking the point vp(s+1) as the first point for the map matching, and going back to step S402; and
S402: outputting matching results from the first point vp(1) to the interruption point vp(s), and executing steps S2-S3 from the next point vp(s+1) to the final point vp(k) until the efficient map matching for the GPS trajectory is completed.

* * * * *